(12) United States Patent
Bentley et al.

(10) Patent No.: US 7,790,010 B2
(45) Date of Patent: Sep. 7, 2010

(54) SPATIALLY SELECTIVE DEPOSITION OF POLYSACCHARIDE LAYER ONTO PATTERNED TEMPLATE

(75) Inventors: William E. Bentley, Annapolis, MD (US); Reza Ghodssi, Rockville, MD (US); Gregory F. Payne, Cockeysville, MD (US); Gary W. Rubloff, Clarksville, MD (US); Li-Qun Wu, North Potomac, MD (US); Hyunmin Yi, Ellicott City, MD (US); Wolfgang Losert, Bethesda, MD (US); Douglas S. English, Silver Spring, MD (US)

(73) Assignees: University of Maryland, College Park, College Park, MD (US); University of Maryland, Baltimore County, Baltimore, MD (US)

( * ) Notice: Subject to any disclaimer, the term of this patent is extended or adjusted under 35 U.S.C. 154(b) by 1394 days.

(21) Appl. No.: 11/155,116

(22) Filed: Jun. 17, 2005

(65) Prior Publication Data

US 2006/0102486 A1    May 18, 2006

Related U.S. Application Data

(63) Continuation-in-part of application No. PCT/US03/40801, filed on Dec. 19, 2003, and a continuation-in-part of application No. PCT/US03/26356, filed on Aug. 22, 2003.

(60) Provisional application No. 60/434,958, filed on Dec. 20, 2002.

(51) Int. Cl.
*C25D 5/02* (2006.01)
*C25D 5/48* (2006.01)
*C25D 9/02* (2006.01)

(52) U.S. Cl. .............. 205/118; 205/136; 205/229; 205/317

(58) Field of Classification Search .................. None
See application file for complete search history.

(56) References Cited

U.S. PATENT DOCUMENTS 4,148,689 A    4/1979    Hino et al.

(Continued)

FOREIGN PATENT DOCUMENTS

JP        A-9 239 396        9/1997

(Continued)

OTHER PUBLICATIONS

Sun et al., Tyronsinase-Containing Chitosan Gels: A Combined Catalyst and Sorbent for Selective Phenol Removal. Biotechnology and Bioengineering, vol. 51, pp. 79-86 (1996).

(Continued)

*Primary Examiner*—Harry D Wilkins, III
(74) *Attorney, Agent, or Firm*—Edell, Shapiro & Finnan LLC (57) ABSTRACT

A method is provided for electrochemically depositing a polymer with spatial selectivity. A substrate having a substrate surface is contacted with an aqueous solution containing a selectively insolubilizable polysaccharide, such as chitosan, which is subjected to electrochemically treatment to deposit, with spatial selectivity, the selectively insolubilizable polysaccharide on a patterned electrically conductive portion of the substrate surface.

34 Claims, 5 Drawing Sheets

U.S. PATENT DOCUMENTS

| | | | | |
|---|---|---|---|---|
| 5,015,576 | A | | 5/1991 | Nilsson et al. |
| 5,147,698 | A | | 9/1992 | Cole |
| 5,422,116 | A | | 6/1995 | Yen et al. |
| 5,474,989 | A | | 12/1995 | Hashimoto et al. |
| 5,658,592 | A | | 8/1997 | Tanihara et al. |
| 5,693,085 | A | * | 12/1997 | Buirge et al. ............... 623/1.13 |
| 5,830,459 | A | | 11/1998 | Cuero et al. |
| 6,044,800 | A | | 4/2000 | Kubo et al. |
| 6,245,901 | B1 | | 6/2001 | Von der Osten et al. |
| 6,548,144 | B1 | * | 4/2003 | Teshima et al. ............. 428/138 |
| 6,562,363 | B1 | | 5/2003 | Mantelle et al. |
| 6,623,950 | B1 | | 9/2003 | Von der Osten et al. |
| 6,638,621 | B2 | | 10/2003 | Anderson et al. |
| 2002/0084194 | A1 | | 7/2002 | Redepenning |

FOREIGN PATENT DOCUMENTS

| | | |
|---|---|---|
| JP | 310041 | 11/1998 |
| WO | WO 00/11038 | 3/2000 |
| WO | WO 2004/018741 | 3/2004 |

OTHER PUBLICATIONS

Tatsumi, K. et al., Removal of Phenols from Wastewater by an Enzyme and Chitosan, Advances in Chitin Sciences, vol. 2, pp. 864-869 (1997).

Muzzarelli, et al., Tyrosinase-mediated quinone tanning of chitinous materials, Carbohydrate Polymers, vol. 24, pp. 295-300 (1994).

Wada et al., "Removal of Phenols and Aromatic Amines from Wastewater by a Combination . . . a Coagulent," Biotechnology & Bioengineering, vol. 45, pp. 304-309 (1995).

Payne et al., "Tyrosinase Reaction/Chitosan Adsorption for Selectively Removing Phenols from Aqueous Mixtures," Biotechnology & Bioengineering, 40, No. 9 (1992).

Seong, et al., "Fabrication of Microchambers Defined by Photopolymerized Hydrogels and Weirs . . . ," Analytical Chemistry, vol. 74, No. 14, pp. 3372-3377 (2002).

Gao, et al., "Lateral Patterning of CdTe Nanocrystal Films by the Electric Field Directed Layer-by-Layer Assembly Method," Langmuir, vol. 18, pp. 4098-4102 (2002).

Chen et al., "pH-Sensitive Thin Hydrogel Microfabricated by Photolithography", Langmuir, vol. 14, pp. 6610-6612 (1998).

Beebe, et al., "Functional Hydrogel Structures for Autonomous Flow Control Inside Microfluidic Channels," Nature, vol. 404, pp. 588-590 (2000).

Sirkar et al., "Amperometric Biosensors Based on Oxidoreductases Immobilized in Photopolymerized . . . " Analytic Chemistry, vol. 70, No. 14, pp. 2888-2894 (1998).

Takenaka, et al., Sol-gel Preparation of a Single Layer, 0.75 micron thick lead zirconate titanate films . . . , "Applied Physics Letters," vol. 79, No. 21 pp. 3485-3487 (2001).

O'Connor, et al., "Immobilization of Neural Cells in Three-Dimensional Matrices for Biosensor Applications," Biosensors & Bioelectrics, vol. 14, pp. 871-881 (2000).

Zhitomirsky, et al., "Cathodic Electrodeposition of Polymer Films and Organoceramic Films," Materials Science and Engineering, vol. B78, pp. 125-130 (2000).

Chen, et al., "Self-Assembly of Monolayers of Cadmium Selenide Nanocrystals with Dual Color Emission," Langmuir, vol. 15, pp. 6845-6850 (1999).

Clark, "Engineering the Microfabrication of Layer-by-Layer Thin Films," Advanced Materials (1998).

Li-Qun Wu, et al., "Chitosan-Mediated and Spatially Selective Electrodeposition of Nanoscale Particles", Langmuir, vol. 21, No. 8, pp. 3641-3646, 2005.

Li-Qun Wu, et al., "Spatially Selective Deposition of a Reactive Polysaccharide Layer onto a Patterned Template", Langmuir, vol. 19, No. 3, pp. 519-524, 2003.

Li-Qun Wu, et al., "Voltage-Dependent Assembly of the Polysaccharide Chitosan onto an Electrode Surface", Langmuir, vol. 18, No. 22, pp. 8620-8625, 2002.

Tianhong Chen, et al., "Enzymatic Methods for in Situ Cell Entrapment and Cell Release", Biomacromolecules, vol. 4, No. 6, pp. 1558-1563, 2003.

Mark. J. Kastantin, et al., "Integrated Fabrication of Polymeric Devices for Biological Applications", Invited Paper, Journal of Sensors and Materials, Special Issue on Biomedical Applications, In Press (Sep. 2003) (18 pages).

Tianhong Chen, et al., "Nature-Inspired Creation of Protein-Polysaccharide Conjugate and Its Subsequent Assembly onto a Patterned Surface", Langmuir, vol. 19, No. 22, pp. 9382-9386, 2003.

Rohan Fernandes, et al., "Electrochemically Induced Deposition of a Polysaccharide Hydrogel onto a Patterned Surface", Langmuir, vol. 19, No. 10, pp. 4058-4062, 2003.

Hyunmin Yi, et al., "A Robust Technique for Assembly of Nucleic Acid Hybridization Chips Based on Electrochemically Templated Chitosan", Analytical Chemistry, vol. 76, No. 2, pp. 365-372, Jan. 15, 2004.

Rohan Fernandes, et al., "Thermo-Biolithography: A Technique for Patterning Nucleic Acids and Proteins", Langmuir, vol. 20, No. 3, pp. 906-913, 2004.

Li-Qun Wu, et al., "Spatially-Selective Assembly of a Reactive Polysaccharide Layer onto Patterned Surfaces", PowerPoint Presentation given on Nov. 8, 2002 (22 slides).

* cited by examiner

Fig. 1

Soluble          Insoluble

SPATIALLY SELECTIVE DEPOSITION OF POLYSACCHARIDE LAYER ONTO PATTERNED TEMPLATE

CROSS-REFERENCE TO RELATED APPLICATIONS

This application is a continuation-in-part of PCT/US03/40801 entitled "Spatially-Selective Deposition of Polysaccharide Layer onto Patterned Template," filed Dec. 19, 2003, which is a continuation-in-part of PCT/US03/26356 entitled "Assembly of Chitosan onto an Electrode Surface," filed Aug. 22, 2003), the complete disclosures of which are incorporated herein by reference; this application claims the benefit of priority of U.S. provisional application No. 60/434,958 filed Dec. 20, 2002 entitled "Spatially Selective Deposition of a Reactive Polysaccharide Layer onto a Patterned Template," the complete disclosure of which is incorporated herein by reference.

GOVERNMENT LICENSING CLAUSE

The U.S. Government has a paid-up license in this invention and the right in limited circumstances to require the patent owner to license others on reasonable terms as provided for by the terms of Grant No. BES-01114790 awarded by the National Science Foundation.

FIELD OF THE INVENTION

This invention relates generally to methods for accomplishing the spatially localized deposition of polysaccharides, and optionally for conjugating desired components (such as molecules, cellular species, and the like) to the polysaccharides. This invention further relates to materials (such as films, coatings, and gels), and to devices, comprising such optionally conjugated, deposited polysaccharides.

BACKGROUND OF THE INVENTION

The ability to create devices such as biosensors, microarrays, and microelectromechanical systems ("MEMS") requires facile methods to precisely control the devices' surfaces. A variety of patterning techniques can be used to produce desired structures, while various methods have been investigated to control surface chemistries. For instance, microfabrication techniques are routinely applied to create patterned inorganic surfaces having nanometer to micrometer scale resolution. However, traditional approaches have not proven particularly successful in adequately bonding organic and biological materials to the patterned inorganic surfaces.

Several approaches have emerged to extend microfabrication techniques for the creation of patterned surfaces with organic and biological materials. One approach is based on an extension of photolithography, and involves selectively irradiating self-assembled monolayers to create a pattern of freshly exposed surface, which is then reacted with a bifunctional agent and a molecule of interest. Reactions include those between thiols and metal surfaces, or between silanes and oxidized silicon (see Bain, C. D., Whitesides, G. M. Angew. Chem. Int. Ed. Engl/. 1989, 28, 506-512; Whitesides, G. M., Laibinis, P. E. Langm. 1990, 6, 87-96; Sagiv, J. J. Am. Chem. Soc. 102, 1980, 92-98; Brzoska, J. B., Azouz, I. B.; Rondelez, F. Langm. 1994, 10, 4367-4373; Allara, D. L., Parikh, A. N., Rondelez, F. Langm. 1995, 11, 2357-2360).

In such methods, a first functional group of the bifunctional agent attaches the agent to the freshly exposed surface, and the second functional group subsequently reacts with the molecule of interest, thereby conjugating it to the surface. Although variations exist, lithography is typically employed to create the spatial template upon which the subsequent conjugation occurs. This first approach has several drawbacks: the required photo-sensitive reagents can be expensive and hazardous to use; additionally, cumbersome steps are required in order to prepare the surface. Furthermore, conventional photolithographic operations require "line-of-sight" and cannot be readily employed on internal surfaces (such as in an enclosed microfluidic system). Alternatively, if the lithographic patterning and subsequent biological functionalization are carried out before the microfluidic device is covered to form a closed fluidic environment, the biofunctionality internal to the microfluidic system cannot be readily reprogrammed. Finally, since many biospecies are labile, i.e., sensitive and delicate with respect to their environmental conditions, fabrication processes required to close the microfluidic system may degrade the biospecies.

A second approach for creating patterned surfaces with organic and biological materials is microcontact printing ("µCP"). In µCP, a soft stamp (typically made of poly-dimethylsiloxane) is created with a preselected pattern. After "inking" the stamp with a solution containing the material to be deposited, the stamp is pressed onto the surface to transfer the pattern. Drawbacks to the microcontact printing approach involve difficulties in stamping with high spatial resolution. Furthermore, the need for direct contact to the surface entails the drawbacks described above for applications to enclosed microfluidic systems (Vaeth, K. M., Jackman, R. J., Black, A. J. Whitesides, G. M., Jensen, K. F., Langmuir 2000, 16, 8495-8500).

Another approach to patterning biomolecules on surfaces is known as "dip-pen" nanolithography." In this process, scanning probe microscopy (similar to atomic force microscopy) is used to "write" species onto a surface with high lateral resolution. For biomolecular species this is accomplished by transport from the writing tip through a water meniscus to the substrate. While the lateral spatial resolution of this patterning method can be very high (30 nm), patterns must be written in serial fashion, entailing throughput limitations similar to those associated with other direct-write approaches such as electron and ion beam lithographies. In addition, dip-pen nanolithography entails the drawbacks described above for applications to enclosed microfluidic systems (Piner, R. D., Zhu, J. Z., Xu, F., Hong, S., Mirkin, C. A., Science 29 Jan. 1999, 283, 661-663; Jong, S., Mirkin, C. A., Science 9 Jun. 2000, 288, 1808-1811; Lyuksyutov, S. F. et. Al., Nature Materials July 2003, 2, 468-474).

Electrophoretic deposition has also been used to assemble colloidal particles and proteins onto electrode surfaces. This approach has been extended to exploit an electric field to direct the spatially selective deposition of CdTe nanocrystals (Gao, M, et al, Langmuir, 18, 4098-4102 (2002)). In this method, a surface with patterned electrodes is first fabricated, and then a combination of an applied voltage and layer-by-layer assembly is used to generate multilayers with spatial resolution in lateral directions. The drawbacks to this assembly approach are that voltages must be maintained to retain the initial layer of nanocrystals, which may not be held to the surface by strong chemical bonds or insolubility. Again, it is not clear from these documents whether these layer-by-layer approaches can be extended to enclosed microfluidic channels.

SUMMARY OF THE INVENTION

It is an object of the present invention to provide a method for accomplishing the spatially-selective and/or temporally-selective deposition of a polymer film, coating, gel, or other solid or semi-solid material, onto a support in response to an alteration of reaction conditions.

It is another object of the present invention to provide a method for accomplishing the spatially-selective and/or temporally-selective deposition of a polymer film, coating, gel, or other solid or semi-solid material onto a support, the polymer being capable of conjugating (or being capable of manipulation to permit conjugation) to or physically entrapping a desired component such as a molecule, a cellular species, particle, and the like.

It is still another object of the present invention to provide a method for spatially and/or temporally depositing desired components, especially a molecule, a cellular species, a particle and the like, on a polymer film coating, gel, or other solid or semi-solid material deposited in a predetermined pattern.

Another object of the present invention is to provide materials, such as films, gels, and the like, comprising an electrochemically deposited polysaccharide, alone or conjugated to or physically entrapping a component, especially a molecule, a cellular species, a particle, and the like.

To achieve one or more of the foregoing objects, and in accordance with the purposes of the invention as embodied and broadly described herein, a first aspect of this invention provides a method for selectively depositing a polymer in spatially localized regions. In a preferred embodiment, the method comprises providing a substrate having a substrate surface, the substrate surface including a patterned electrically conductive portion and an electrically non-conductive portion. The substrate surface is contacted with an aqueous solution containing a selectively insolubilizable polysaccharide. The selectively insolubilizable polysaccharide is spatially selectively electrochemically deposited on the electrically conductive pattern in a spatially selective manner.

A second aspect of the invention provides a polymer material comprising a selectively insolubilizable polysaccharide electrochemically deposited in a spatially selective pattern.

According to a third aspect of the invention, a method for spatially selectively depositing of a polymer is provided. The method comprises contacting a substrate possessing a surface having an electrically conductive pattern thereon with an aqueous solution containing a selectively insolubilizable polysaccharide, spatially selectively depositing the selectively insolubilizable polysaccharide on the electrically conductive pattern, and modifying the selectively insolubilizable polysaccharide (before or after deposition) to facilitate its ability to conjugate with reactive groups of a component, such as a molecule, or cellular species.

In accordance with a fourth aspect of the invention, a polymer material is provided comprising a selectively insolubilizable polysaccharide that is electrochemically deposited in a spatially selective pattern, the polymer having been modified to facilitate its ability to conjugate with reactive groups of a component, such as a molecule, cellular species, or particle.

A fifth aspect of the invention provides a method for spatially selectively depositing a component, such as a molecule, cellular species, or particle. According to this aspect, the method comprises providing a patterned solid or semi-solid material, e.g., film, coating, gel, or the like, optionally modifying the material to make it more receptive to conjugation with a reactive group of the component, and reacting the material with the component to covalently bond the component to the solid or semi-solid material. Owing to the flexibility of the invention, any of a wide variety of different components can be conjugated to the polysaccharide. Such components include, for example, molecules and cellular species.

According to a sixth aspect of the invention, a material is provided comprising a selectively insolubilizable polysaccharide electrochemically deposited in a spatially selective pattern, and a component coupled to the polysaccharide in a corresponding spatially selective pattern. In an embodiment of the invention, the polymer has been modified to facilitate its ability to conjugate with reactive groups of component, such as a molecule or a cellular species.

A seventh aspect of the invention provides a method of spatially selectively depositing material physically entrapping a component. According to this method, the component is dispersed in an aqueous solution containing a selectively insolubilizable polysaccharide. The aqueous solution is contacted with a substrate surface including a patterned electrically conductive portion and an electrically non-conductive portion. The selectively insolubilizable polysaccharide is electrochemically deposited on the electrically conductive pattern in a spatially selective manner to establish a solid or semi-solid (e.g., gel) material having the component physically entrapped therein. Examples of components include a molecule, a cellular species, or a particle.

An eighth aspect of the invention provides a solid or semi-solid electrochemically material having a component entrapped therein.

The invention is particularly adapted to use as such conjugated molecules, biomolecules, including nucleic acid molecules, proteins (e.g., enzymes, receptors, receptor ligands, drugs, hormones, antibodies, etc.). The cellular species that may be conjugated in accordance with the above-described aspects of the invention include viruses, bacterial cells, fungal cells (including yeast cells), eukaryotic cells (e.g., plant cells, non-human animal cells, insect cells, human cells, etc.). Such cellular species may be normal (e.g., "wild-type") or may possess desired abnormal characteristics (e.g., tumor cells, cells arraying desired antigens, etc.). The particles that may be used in accordance with the above-described aspects of the invention particularly include nanoscale particles (or nanoparticles), quantum dots, nanofibers, dendrimers, etc.

BRIEF DESCRIPTION OF THE DRAWINGS

The accompanying drawings are incorporated in and constitute a part of the specification. The drawings, together with the general description given above and the detailed description of the certain preferred embodiments and methods given below, serve to explain the principles of the invention. In such drawings.

DETAILED DESCRIPTION OF THE PREFERRED EMBODIMENTS

Reference will now be made in detail to the presently preferred embodiments and methods of the invention as illustrated in the accompanying drawings. It should be noted, however, that the invention in its broader aspects is not limited to the specific details, representative assemblies and methods, and illustrative examples shown and described in this section in connection with the preferred embodiments and methods. The invention according to its various aspects is particularly pointed out and distinctly claimed in the attached claims read in view of this specification, and appropriate equivalents.

According to an embodiment of the present invention, a method is provided for spatially selectively depositing a polymer, such as a biopolymer or a natural or synthetic polymer, the method comprising contacting a substrate possessing a substrate surface having a patterned electrically conductive portion and an electrically non-conductive portion with an aqueous solution containing a selectively insolubilizable polysaccharide, and electrochemically depositing the selectively insolubilizable polysaccharide on the electrically conductive pattern to establish a spatially selectively deposited polymer.

As used herein, a "substrate" or "wafer" comprises a platform on which an electrically conductive pattern may be deposited or otherwise formed. The platform may be formed of one or more materials, may be homogeneous or heterogeneous, and may contain a surface film. The surface may be flat, closed (e.g., the inside surface of a cylinder, etc.), curved, multi-leveled, etc., and may optionally include channels (e.g., microchannels), ridges, indentations, protuberances, and the like. Substrates are preferably substantially electrically non-conducting or possess a substantially electrically non-conducting surface on which the electrically conductive pattern is formed. Such substrates may be made of inorganic materials, for example, a silicon wafer optionally having a surface oxide film. Other inorganic materials include silicon oxide, silicon nitride, and the like.

The substrate includes one or more surface portions containing a patterned electrically conductive region and an electrically non-conductive region. As referred to herein, a "pattern" refers to the spatial distribution of a material that causes the surface to comprise user-defined electrically conductive regions and user defined electrically non-conductive regions. The pattern may extend from one surface to another, or be localized on a single surface. A pattern may comprise a repeating arrangement of objects or shapes, a non-repeating or random arrangement of objects or shapes, a particular defined shape, array, or the like. For example, the pattern may comprise a plurality of parallel lines spaced apart from one another by uniform or non-uniform intervals. The pattern may be coplanar or offset from the principle surface of the substrate, e.g., as in the case of microchannels. The material or materials selected for patterning are preferably those upon which the selectively insolubilizable polysaccharide may be deposited via electrochemical deposition. Suitable materials are electrically conductive, and may include metals (e.g., aluminum, antimony, cadmium, chromium, cobalt, copper, gold, iron, lead, magnesium, mercury, nickel, palladium, platinum, silver, tin, tungsten, zinc), metal alloys (steel, brass, bronze, etc.), semiconductors (e.g., silicon, gallium or germanium semiconductor materials), and/or conductive polymers (e.g., polypyrrole).

Figure 2:
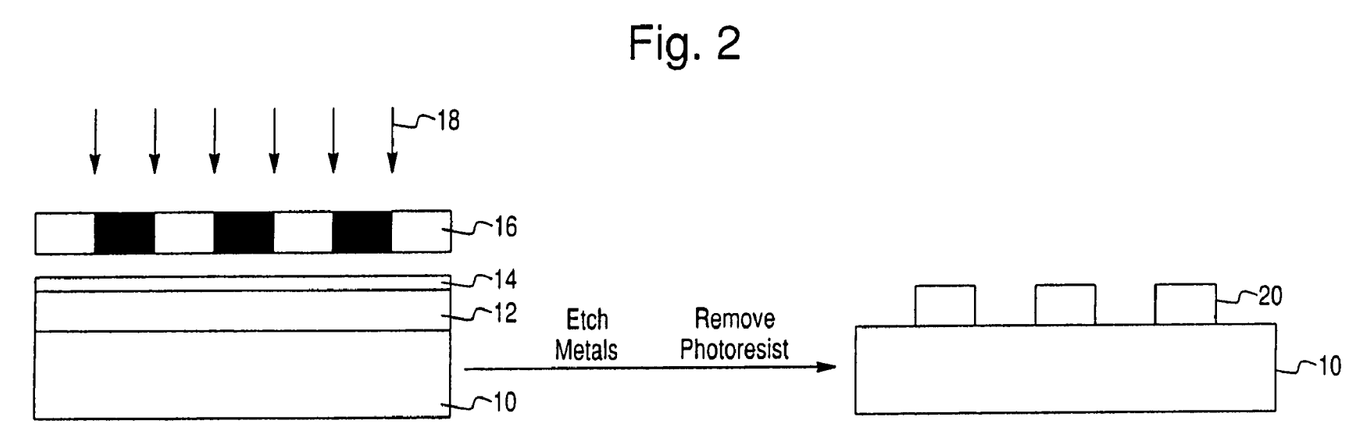
FIG. 2 shows a progression of steps of a microfabrication technique for establishing an electrically conductive, e.g., metal, pattern on a substrate.

Deposition of the electrically conductive patterned material on the substrate may be accomplished by any suitable technique. For example, standard microfabrication techniques may be selected to pattern an electrically conductive material, e.g., gold, onto an electrically insulative substrate. Referring to FIG. 2, there is shown an exemplary technique for patterning an electrically conductive material on a substrate. In FIG. 2, the selected substrate 10 comprises silicon wafers with a thermal oxide film. A metal layer or layers 12, for example chromium and gold in the illustrated embodiment, are sputtered (simultaneously or consecutively) or otherwise deposited onto the wafer 10 to provide a bi-layer metal structure. Next, the deposited metal is optionally covered with a primer, then a photoresist 14 is applied to the primed metal surface, e.g., via conventional spin-coating techniques. A mask 16 is placed over the photoresist, and the photoresist is then patterned, for example, by exposure of the unmasked portions of the photoresist to UV light 18. The exposed, non-masked areas were then etched with a suitable etchant to develop the sputtered metals into a pattern. The photoresist may then be removed, such as with a solvent, e.g., acetone, leaving the patterned sputtered metal(s) 20 over the substrate 10.

The patterned electrically conductive material serves as a platform for the electric field directed deposition of polysaccharide. Preferably, the polysaccharide is deposited on the patterned electrically conductive portion of the substrate surface, but not the electrically non-conductive portion. Thus, the deposition of the polysaccharide is spatially selective based on the pattern of the electrically conductive portion.

The compositions of the present invention preferably comprise selectively insolubilizable polysaccharides capable of solubilizing in a liquid medium, preferably aqueous, and forming or otherwise depositing an insoluble coating, gel, or other layer onto a support in response to an alteration in reaction conditions. As used herein, the term "polysaccharide" includes starches and polysugars, particularly polymers containing glucosamine residues. Ionizable polysaccharides include carboxymethylcellulose, chitosan and chitosan sulfate, ligninsulfonates, and synthetic polymers such as, for example, polymethacrylic acid, polyvinylsulfonic acid, polyvinylphosphonic acid and polyethyleneimine; ionizable agar, alginate, and carrageen and similar extracts of plants may be also be used. Other suitable polysaccharides include gums from trees, pectins from fruits, starches from vegetables, and celluloses from woody fibers. Chitosan is the preferred ionizable polysaccharide of the present invention.

In preferred embodiments, the selective insolubilization of the polysaccharides of the present invention is accomplished by modifying the polysaccharide to contain one or more ionizable group(s), which may be the same or different, such that at one or more range(s) of pH the polysaccharide will be soluble in an aqueous solvent ("solubilizing pH ranges") whereas at one or more other pH values range(s), the polysaccharide will be insoluble (or less soluble), and thus be capable of forming an insoluble coating, gel, or other layer onto a support or otherwise depositing itself onto the support. Suitable ionizable groups include those ionizable at low pH, e.g., capable of forming a positive charge (e.g., alkyl amine groups, primary, secondary or tertiary amine groups, guanidinium groups, imidazole groups, indole groups, purine groups, pyrimidine groups, pyrrole groups, etc.) and those that are ionizable at high pH, e.g., capable of forming a negative charge (e.g., alkoxide groups, carboxyl groups, hydroxy acid groups, phenolic groups, phosphate groups, sulfhydryl groups, etc.). Suitable groups may exhibit multiple pKs, which may be the same (e.g. polyacidic or polybasic) or different (e.g., zwitterionic). For selectively insolubilizable polysaccharides that are ionizable at low pH, amine groups are preferred; for selectively insolubilizable polysaccharides that are ionizable at high pH, carboxyl groups are preferred.

Figure 1:
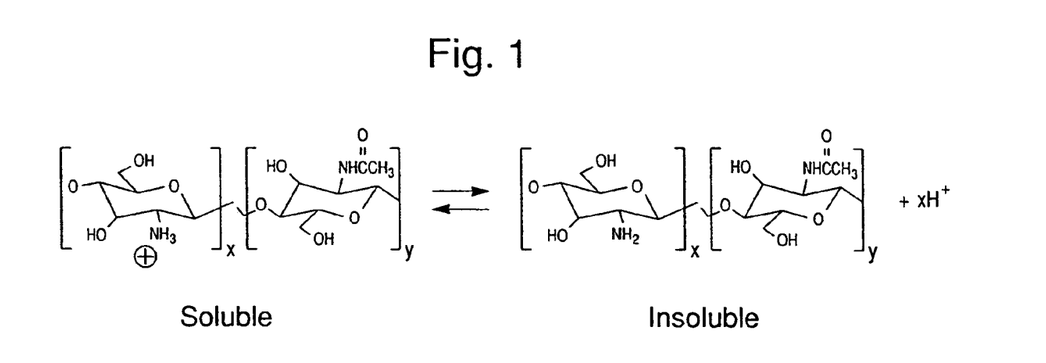
FIG. 1 shows the transformation of the selectively insolubilizable polysaccharide chitosan from a soluble phase to an insoluble phase.

For example, a preferred selectively insolubilizable polysaccharide is chitosan, which is an amine-rich polysaccharide derived by deacetylation of chitin. Chitin is the second most abundant polysaccharide in nature and is found in crustaceans, insects, and fungi. Chitosan has primary amino groups that have pKa values of about 6.3. At pH's below the pKa, amino groups are protonated, making chitosan a water-soluble, cationic polyelectrolyte. At pH's above about 6.3, chitosan's amino groups are deprotonated, and the chitosan polymer becomes insoluble, as shown in FIG. 1. Chitosan's pH-dependent solubility allows the biopolymer to be processed in an aqueous solution, and brought out of solution and formed into various shapes (e.g., beads, membranes, and films) conforming to the pattern of the conductive portion of the substrate by imparting a modest increase in pH, e.g., to neutrality.

Figure 3:
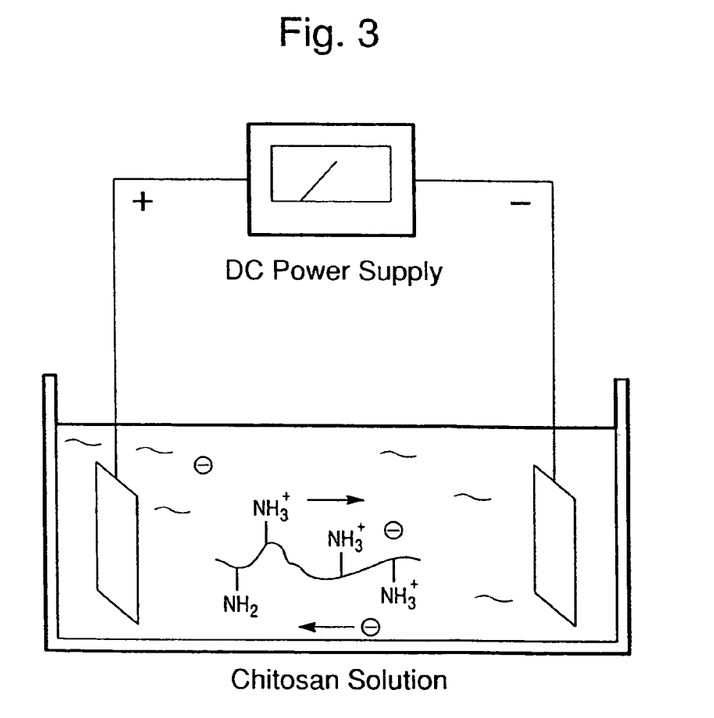
FIG. 3 is a simplified representation of an electrochemical deposition cell for carrying out a method according to an embodiment of the invention.

FIG. 3. shows a suitable electrochemical deposition assembly for depositing the polysaccharide onto a patterned substrate. The assembly comprises a power source 30, such as a DC source, and a positive electrode 32 (anode) and a negative electrode 34 (cathode) connected to the power source with appropriate wiring or electrical connections. The patterned electrically conductive material is polarized to serve as the negative electrode. The positive electrode may be, for example, a non-patterned metal-coated (e.g., gold-coated) silicon wafer.

The electrodes are immersed in an aqueous solution 36 comprising the selectively insolubilizable polysaccharide, preferably in a solubilized state. A suitable pH for deposition of the polysaccharide onto a substrate is any pH below the solubility limit. For example, an aqueous solution will have a pH less than about 6.3, more preferably less than about 5 to solubilize chitosan into solution. For the chitosan solution used to deposit chitosan onto a substrate, suitable concentrations of chitosan may vary, for example, from about 0.0001 to about 0.001 (w/v) %, about 0.001 to about 0.01 (w/v) %, about 0.01 to about 0.1 (w/v) %, about 0.1 to about 1 (w/v) %, about 1 to about 10 (w/v) %, about 10 to about 20 (w/v), and about 20 to about 30 (w/v) %.

Chemical deposition of the selectively insolubilizable polysaccharide is preferably electrode selective, providing another degree of control over the process. In the case of a polysaccharide containing a group ionizable at a low pH, e.g., capable of forming a positive charge (e.g., alkyl amine groups, primary, secondary or tertiary amine groups, guanidinium groups, imidazole groups, indole groups, purine groups, pyrimidine groups, pyrrole groups, etc.), the solubilized polysaccharide is attracted to and deposited on the negative electrode.

Moderate increases in the pH above the pKa of the selectively insolubilizable polysaccharide stabilize the polysaccharide in an insoluble state, forming a stable coating, gel, or other solid or semi-solid layer that optionally may be removed from the negative electrode. Positively charged polysaccharides are not attracted to the positive electrode, and do not deposit on the positive electrode. In contrast, a polysaccharide containing a group ionizable at a high pH, e.g., capable of forming a negative charge (e.g., alkoxide groups, carboxyl groups, carboxylate groups, hydroxy acid groups, phenolic groups, phosphate groups, sulfhydryl groups, etc.), is attracted in its soluble state to the positive electrode and deposits on the positive electrode, but not the negative electrode. Hence, a moderate decrease in the pH below the pKa of such selectively insolubilizable polysaccharide will stabilize the polysaccharide into a stable coating, gel, or other solid or semi-solid layer that may be removed from the positive electrode.

Various aspects of the electrochemical cell, reaction conditions, and process parameters may be manipulated to control the chemical deposition of the selectively insolubilizable polysaccharide on the patterned electrode and the resulting properties of the polysaccharide thin film. For example, the shape of the patterned electrically conductive material on which the polysaccharide deposits largely dictates the spatial distribution and localization of the deposited polysaccharide. Examples of conditions and parameters that affect characteristics of the deposit include the applied voltage, current, pH level, total ion concentration, polysaccharide concentration, temperature, deposition time, and the like. In a preferred embodiment of the invention, the applied current or voltage is kept constant during electrochemical deposition. The thickness and spatial resolution of the deposit can be adjusted by altering conditions. For instance, deposition thickness is increased by increases in voltage, current density, and polymer concentration in the solution.

Figure 4:
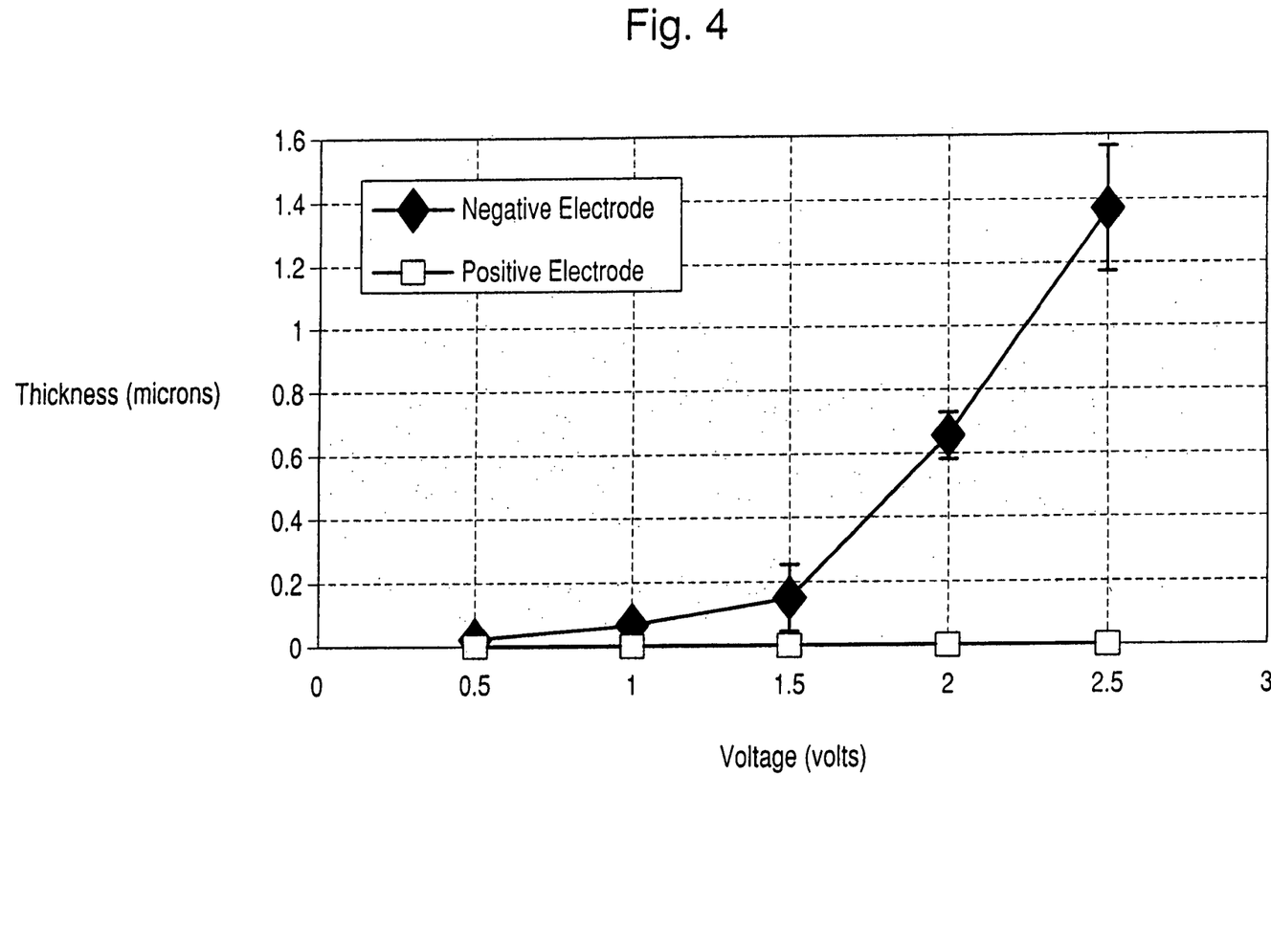
FIG. 4 is a graph showing the relationship between applied voltage (volts) and film thickness (microns) for depositing a chitosan film on a gold template according to an embodiment of the invention.

For example, from its soluble state, the chitosan deposits onto the patterned platform, i.e., the negative electrode, in a spatially selective manner corresponding in shape to the patterned template. The thickness of the deposited chitosan may range from tens of nanometers to micrometers. The deposition can be controlled temporally and spatially based on when and where the voltage is applied, respectively. For example, spatial selectivity may be controlled based on the arrangement of negative electrode to produce a desired pattern. Temporal selectivity may be controlled by selectively applying the voltage to selected (yet electrically isolated) regions of the negative electrode(s) at different times, e.g., sequentially, thereby controlling the sequence in which and rate at which the chitosan is deposited on different regions of the electrode. Further, the concentration of the chitosan solution, the voltage and the time a current is applied to deposit chitosan onto a substrate can be varied to control the extent of polysaccharide deposition. FIG. 4 is a graph illustrating the relationship between applied voltage and film thickness (microns) for chitosan deposited on a gold template. The film thickness may measure, for example, from about 0.01 to about 3 microns, from about 0.01 to about 1.5 microns, or from about 0.02 to about 0.8 microns. For the chitosan polysaccharide, deposition occurs only on the electrode which is biased negatively; this corresponds to attracting the positively charged amine groups characteristic of the chitosan biopolymer in acidic solution.

In a preferred embodiment of the invention, the selectively insolubilizable polysaccharide deposited on the electrode(s) is stabilized (or destabilized) by pH adjustment, such as by washing the deposited polysaccharide with a liquid selected from water, a solution of neutral pH, a basic solution, and an acidic solution. In the case of a polysaccharide containing a group ionizable at a low pH, e.g., capable of forming a positive charge (e.g., amine groups), raising the pH will increase the insolubility of the deposited polysaccharide and improve stabilization. On the other hand, lowering the pH of the positively charged ionizable polysaccharide will lead to destablization. In contrast, in the case of a polysaccharide containing a group ionizable at a high pH, e.g., capable of forming a negative charge (e.g., a carboxyl group), lowering the pH will improve stabilization, whereas raising pH will lead to instability.

The electrodeposition of the polysaccharide, for example chitosan, is accomplished by application of an electrical voltage between the spatially defined deposition electrode (e.g., a patterned gold wire) and a counterelectrode. The operational electrical circuit may be controlled by using a controlled constant voltage, a controlled constant current, or a mixture of the two as the deposition proceeds. Using constant voltage there is typically a large current and high deposition rate until an initial chitosan thin film is achieved, after which the current is reduced by the series resistance of the chitosan. Using constant current, the initial voltage is typically small but then decreases rather quickly to a nearly constant value as the resistive chitosan thin film develops on the surface. For example, under typical conditions at a constant 0.4 mA current and current density 2-5 A/m$^2$, the voltage rises within 1 min to slightly over 2 V and remains nearly constant over a total deposition time of 5 min. The deposition process is more reproducible and controllable for constant current mode of electrodeposition of chitosan.

For example, washing an acidic, soluble chitosan deposit with a base neutralizes and deprotonates the chitosan, converting the chitosan into an insoluble, stable film. Suitable bases include sodium hydroxide, ammonium and organic bases. The chitosan film is stabilized by neutralization, permitting the chitosan to be retained on the electrode surface in the absence of an applied voltage. The deposited chitosan film may possess a high amine group concentration of about $10^{14}$-$10^{15}$/cm$^2$, e.g., $10^{14}$/cm$^2$, preferably in a substantially homogeneous distribution. The chitosan film may include N-acetylglucosamine residues and/or blocks, preferably in a concentration of less than 40 weight percent, more preferably less than 30 weight percent. On the other hand, washing the chitosan deposits with an acid to lower the pH below the pKa will dissolve the chitosan.

In some preferred embodiments, the selectively insolubilizable polysaccharides may serve as a template for surface-controlled bonding and reaction of one or more types of components. Such components may comprise molecules (e.g., enzyme substrates, organic or inorganic chemicals, chelating agents, etc.) and especially biomolecules such as nucleic acid molecules (e.g., DNA, RNA, etc.), peptides, proteins (e.g., enzymes, receptors, receptor ligands, drugs, hormones, antibodies, etc.), particles (especially nanoscale particles (or nanoparticles), quantum dots, nanofibers, and dendrimers, etc.), cellular species (e.g., viruses, bacterial cells, fungal cells (including yeast cells), eukaryotic cells (e.g., plant cells, non-human animal cells, insect cells, human cells, etc.). Such cellular species may be normal (e.g., "wild-type") or may possess desired abnormal characteristics (e.g., tumor cells, cells arraying desired antigens, etc.).

The selectively insolubilizable polysaccharides of the present invention may be modified to facilitate their ability to stably conjugate with reactive groups of such components. Such modifications may include cross-linking agents. Such agents include bivalent, trivalent or multivalent cross-lining agents. Examples of such agents include dialdehydes (such as glutaldehyde, formaldehyde, glyoxal), anhydrides (such as succinimide, carbodiimide, dicyclohexylcarbodiimide, etc.), genipin, amino acids, etc. or non-covalent crosslinking agents (such as tripolyphosphate (TPP), etc.). In one embodiment, such cross-linking agents will be nonspecifically divalent or multivalent, possessing two or more identical reactive groups that can be used to conjugate the polysaccharides of the present invention to one or more components (e.g., glutaraldehyde, lysine, arginine, glutamate, aspartate, polysaccharides, etc.). More preferably, however, such cross-linking agents will comprise two or more different relevant reactive groups such that an orthogonal synthetic approach may be employed (see, e.g., Dawson, P. E. et al. Annu. Rev. Biochem. 69:923-960 (2000); Tam, J. P. et al. Biopolymers 51:311-332 (1999); Dawson, P. E. et al. Science 266:776-779 (1994); Nilsson, B. L. Org. Lett. 2:1939-1941 (2000)). Examples of such cross-linking agents include those comprising an amino group and a carboxy group. The carboxyl group of such cross-linking agents can be conjugated to the amine group of, for example, chitosan, to yield a free, and more sterically accessible, amino group that can be conjugated to the carboxy group of a glutamate or aspartate residue of a protein. Likewise, the polysaccharides of the present invention can be modified to contain chloromethylbenzyl or trialkylsulfoniumbenzyl groups that can then react with the carboxyl group of other molecules.

Owing to the flexibility of the chemistry involved, any of a wide variety of different components can be conjugated to the polymer. Such components particularly include proteins (especially enzymes, receptors, receptor ligands, or antibodies) and nucleic acid molecules (especially DNA or RNA). Depending upon the particular compound selected, conjugation may occur before or after (or both) deposition of the selectively insolubilizable polysaccharide onto the substrate.

For example, chitosan possesses amino groups that confer nucleophilic properties to the polymer. Specifically, the deprotonated amino groups have an unshared electron pair that can undergo reaction with a variety of electrophiles. As a result, various chemistries can be exploited to crosslink chitosan and to graft components onto the polymer. The component may be coupled to the solubilized chitosan and deposited from solution. Alternatively, the substituent may be coupled to the chitosan after the chitosan has been deposited onto the negative electrode. In the examples below, the substituent selected comprises a fluorescein derivative activated with N-hydroxy succinimide ("NHS") to be reactive toward chitosan's amino groups. Various other cellular species and molecules, including labile biomolecules, may be selected to replace the fluorescein derivative. Such biomolecules include proteins, enzymes, polynucleotides, RNA, DNA, cells, and the like. The molecules are assembled on the polysaccharide template, which acts as an interface between the molecules and the inorganic substrate.

The conjugated selectively insolubilizable polysacchides of the present invention can be used to provide a spatially and/or temporally defined two-dimensional surface or three-dimensional matrix for molecular interactions.

In one embodiment, the conjugated components of such surfaces or matrices will comprise one, two, three or more enzyme species, each of which will preferably be placed in a spatially and/or temporally discrete region of such surfaces or matrices. Significantly, by incubating such surfaces or matrices in contact with a fluidic layer (i.e., a surface or matrix that contains a flowing or flowable liquid or gas capable of transporting other molecules (e.g., nucleic acid molecules, proteins, enzymatic substrates and/or products, etc.)), multiple stepwise synthetic reactions can be made to occur, either sequentially or in parallel. Suitable enzyme species include: aminopeptidases, angiotensin converting enzymes, caspases, cathepsins, cholinesterases, collagenases, deaminases, endonucleases, endopeptidases, esterases, exonucleases, lipases, nucleotidases, phosphatases, proteases, restriction endonucleases, etc.

In a second embodiment, the conjugated components of such surfaces or matrices will comprise one, two, three or more antibody species each of which will preferably be placed in a spatially and/or temporally discrete region of such surfaces or matrices. As used herein, the term "antibodies" is intended to encompass not only conventional immunoglobulins, but also single chain antibodies, humanized antibodies, monoclonal antibodies, etc. Significantly, by incubating such surfaces or matrices in contact with a fluidic layer containing antigens, multiple immunoassays can be simultaneously or sequentially conducted. Any of a wide variety of assay formats may be used in accordance with the methods of the present invention. They may be heterogeneous or homogeneous, and they may be sequential or simultaneous. They may be competitive or non-competitive. U.S. Pat. Nos. 5,563,036; 5,627,080; 5,633,141; 5,679,525; 5,691,147; 5,698,411; 5,747,352; 5,811,526; 5,851,778 and 5,976,822 illustrate several different assay formats and applications.

In a third embodiment, the conjugated components of such surfaces or matrices will comprise one, two, three or more bound receptor molecule species or bound ligands of receptor molecules each of which will preferably be placed in a spatially and/or temporally discrete region of such surfaces or matrices. Significantly, by incubating such surfaces or matrices in contact with a biological sample, multiple receptor/receptor ligand binding assays can be simultaneously or sequentially conducted. Suitable receptor species include: 5-hydroxytryptamine receptors, acetylcholine receptors, adenosine receptors, adrenoceptor receptors, adrenomedullin receptors, amylin receptors, amyloidreceptors, angiotensin receptors, atrial natriuretic peptide (ANP) receptors, bombesin receptors, bradykinin receptors, calcium-channel receptors, cannabinoid receptors, cgrp receptors, chemokine receptors, cholecystokinin and gastrin (CCK) receptors, corticotropin releasing factor (CRF) receptors, dopamine receptors, endothelin receptors, excitatory amino acid receptors, gaba receptors, galanin receptors, gastric inhibitory peptide (GIP) receptors, GDNF receptors, glucagon receptors, glucagon-like peptide receptors, glycoprotein hormones receptors, growth hormone secretagogue receptors, GTP-binding-protein receptors, hemotopoietin receptors, histamine receptors, imidazole receptors, integrin receptors, interleukin-1 receptors, melanin-concentrating hormone receptors, melanocortin receptors, melatonin receptors, metastin receptors, motilin receptors, neuromedin receptors, neuropeptide FF receptors, neuropeptide Y receptors, neurotensin receptors, opioid receptors, orexin receptors, P2 purinoceptor receptors, parathyroid hormone (PTH) receptors, phosphodiesterase enzyme, platelet activating factor (PAF) receptors, potassium-channel receptors, prolactin receptors, prostanoid receptors, retinoid receptors, selectin receptors, somatostatin receptors, steroid receptors, tachykinin receptors, tumour necrosis factor (TNF) receptors, tyrosine kinase receptors, urotensin II receptors, vasoactive intestinal peptide (VIP) receptors, vasopressin receptors, etc.

In a fourth embodiment, the conjugated components (or molecules) of such surfaces or matrices will comprise one, two, three or more bound nucleic acid molecule species, which may be DNA or RNA or be composed of non-naturally occurring residues (e.g., PNA). Such nucleic acid molecules may have defined sequences (such as the sequences of genes or fragments thereof), or may be composed of random or pseudorandom oligonucleotides (i.e., nucleic acid molecules of 3-100 nucleotides in length) or polynucleotides (i.e, nucleic acid molecules greater than 100 nucleotides in length). Significantly, by incubating such surfaces or matrices in contact with a biological sample (or an extract thereof), multiple hybridization reactions involving nucleic acid molecules present in the sample can be simultaneously or sequentially conducted. Such hybridization reactions can be used in concert with nucleic acid amplification strategies (such as the polymerase chain reaction (PCR) (e.g., U.S. Pat. Nos. 4,683, 202; 4,582,788; U.S. Pat. Nos. 4,683,194, 6,642,000, etc.)); ligase chain reaction (LCR), self-sustained sequence replication (3SR) (e.g., Guatelli et al., Proc. Natl. Acad. Sci. USA 87:1874-1878 (1990); PCT Publication. WO 88/10315), nucleic acid sequence based amplification (NASBA) (e.g., Kievits, J Virol Methods. 35:273-86 (1991)), strand displacement amplification (SDA) (e.g., U.S. Pat. No. 5,270,184), and amplification with Qβ replicase (Birkenmeyer et al., J. Virological Methods, 35:117-126 (1991); Landegren, Trends Genetics, 9:199-202 (1993); and rolling circle amplification (e.g., U.S. Pat. Nos. 5,854,033; 6,183,960; 5,354,668; 5,733, 733)) to accomplish the amplification of the hybridized molecules, or their complements. The present invention permits hundreds, thousands, or tens of thousands of nucleic acid species to be deposited on to such surfaces or matrices.

Additionally, such hybridization reactions may be used to sequence the nucleic acid molecules present in the sample, or to assess the expression profile of the genes of cells present in the biological sample (or an extract thereof) (see, e.g., U.S. Pat. Nos. 6,632,606; 5,002,867; 5,202,231; 5,888,819; Lipshutz et al., Biotechniques, 9(3):442-447 (1995) and Chee et al., Science, 274:610-614 (1996); DeRisi, J. et al. (1996) "USE OF A cDNA MICROARRAY TO ANALYSE GENE EXPRESSION PATTERNS IN HUMAN CANCER" *Nature Genetics* 14:457-60; Luo, L. et al. (1999) "GENE EXPRESSION PROFILES OF LASER-CAPTURED ADJACENT NEURONAL SUBTYPES" *Nature Medicine* 5:117-22; Bonner, R. F. et al (1997) "LASER CAPTURE MICRODISSECTION: MOLECULAR ANALYSIS OF TISSUE" *Science* 278:1481, 1483; Schena, M. et al. (1995) "QUANTITATIVE MONITORING OF GENE EXPRESSION PATTERNS WITH A COMPLEMENTARY DNA MICROARRAY" *Science* 270:467-70).

In a fifth embodiment, the conjugated components of such surfaces or matrices will comprise one, two, three or more non-ionizable polysaccharides or other polymer molecules each of which will preferably be placed in a spatially discrete region of such surfaces or matrices. Significantly, this aspect of the present invention permits one to accomplish the spatial and/or temporal selective deposition of polymers that are not readily amenable to direct spatial and/or temporal deposition onto a surface or matrix. Thus, for example, the present invention permits one to accomplish the spatial and/or temporal selective deposition of polymers such as: aramids, celluloses, kevlars, nomex, nylons, poly(ether sulfone)s, poly(methyl methacrylate)s, poly(phenylene oxide)s, poly(phenylene sulfide)s, poly(vinyl acetate)s, poly(vinyl chloride)s, poly(vinyl) fluorides, poly(vinylidene chloride)s, poly(vinylidene fluoride)s, polyacrylonitriles, polybutadienes, polycarbonates, polychloroprene, polycyanoacrylates, polydicyclopentadienes, polyesters, polyethylenes, polyimides, polyisobutylenes, polyketones, polypropylenes, polystyrenes, polytetrafluoroethylenes, polyurethanes, polyvinylpyrrolidones, rayons, silicones, starches, etc.

It is contemplated that the deposited films of the present invention may be used in various settings and environments and as components for various devices, including, for example, biosensors, microarrays, micro electromechanical systems (MEMS), and complex, multi-site biomicrofluidics applications and associated multi-step biochemical reaction sequences.

According to another embodiment of the invention, a component is entrapped and immobilized in a polysaccharide that confers spatial selectivity to electrochemical deposition.

The component selected for this embodiment may be one or more of the biomolecules and cellular species mentioned above. Other components, including those not capable of covalently bonding to the polysaccharide, are also candidates. For example, the components may comprise nanoscale particles (or nanoparticles), quantum dots, nanofibers, and dendrimers.

In accordance with this embodiment, the component is suspended in the aqueous solution of selectively insolubilizable polysaccharide, which may be any of the polysaccharides mentioned above. The aqueous solution is subjected to an electrochemical deposition treatment on a substrate having a patterned conductive portion. Polysaccharides and electrochemical treatment procedures and conditions relating to other embodiments described herein may be employed for this embodiment. The polysaccharide insolubilizes out of solution to establish a patterned film on the patterned conductive portion. At the same time, the component(s) contained in the solution are physically entrapped and immobilized within the deposited polysaccharide. Preferably, the immobilized components are dispersed substantially homogenously throughout the polysaccharide.

The methods and materials of embodiments of the present invention provide numerous benefits and advantages when used MEMS and similar devices. For example, the fabrication technique is relatively simple to practice compared to conventional silicon-based MEMS approaches. Also, the product cost is reduced, both in terms of material cost and processing costs. Additionally, the internal surfaces of the microfluidic MEMS environment of embodiments of the invention are polymeric, making the material surfaces considerably more biocompatible than if they included inorganic semiconductor and metallic surfaces.

The following examples serve to explain and elucidate the principles and practice of the present invention further. These examples are merely illustrative, and not exhaustive as to the scope of the present invention.

EXAMPLES

Preliminary Procedures for Examples 1 and 2

Chitosan from crab shells (85% deacetylation) and phosphatebuffered saline (PES) tablets were purchased from Sigma-Aldrich Chemicals. 5-(and 6-)-Carboxylfluorescein succinimidyl ester (NHS-fluorescein, excitation maximum 495 nm and emission maximum 519 nm) was purchased from Molecular Probes and stored desiccated at $-20°$ C. in a dark container until use. Silicon wafers with 1 µm thick thermal oxide film (four inch diameter) were obtained from MEMC Electronic Materials. The gold and chromium used for sputtering onto the wafer were purchased from Kurt J. Lesker Co. The primer was hexamethyldisilazane (HMDS, Microelectronic Materials). The photoresist (Microposit Photoresist S1813) and developer (Microposit Developer 352) were purchased from Shipley Co. The etchants (TFA for gold and TFD for chromium) were obtained from Transene Co.

Chitosan solutions were prepared by adding chitosan flakes to water and incrementally adding small amounts of HCl to the solution to maintain the pH near 3. After being mixed overnight, the chitosan solutions were filtered to remove undissolved material, and the pH of solution was adjusted using NaOH (1 M). NHS-fluorescein solution was prepared by first dissolving 2.5 mg of NHS-fluorescein in 200 µL of dry dimethylformamide (DMF) and then adding 800 µL of ethanol.

Fluorescently labeled chitosan derivatives facilitate visualization, a labeled chitosan was prepared by reacting a chitosan film with NHS-fluorescein. The chitosan film was made by adding 50 mL of a 0.4% (w/v) chitosan solution (pH 3.0) to 140 mm diameter Petri dishes. The Petri dishes were oven-dried overnight at 45° C., and then the dried films were neutralized by immersion in 1 M NaOH for 3-4 h. After neutralization, the films were washed thoroughly with distilled water and equilibrated with a 0.1 M PES buffer. This buffer was prepared by dissolving PES tablets in double distilled $H_2O$ and adjusting the pH to 7.4. The labeling reaction was initiated by adding 20 µL of NHS-fluorescein solution (the DMF/ethanol solution described above) into a Petri dish containing a chitosan film in 35 mL of PES buffer. After allowing 30 min for reaction, the yellowish-green-colored chitosan films were then rinsed with distilled water and dissolved in a dilute HCl solution (pH=3). For purification, the fluorescein-labeled chitosan was precipitated by adjusting the pH to about 9 using NaOH. The precipitant was then collected and rinsed with distilled water. After purification the fluorescently labeled chitosan was redissolved in a dilute HCl solution and the pH was adjusted to 5.6. To determine the polymer concentration, aliquots of known mass were oven-dried, and the residue was weighed.

The patterned surfaces were fabricated by depositing 150 Å thick chromium and then 2000 Å thick gold films on 4-inch diameter silicon wafers, which had previously been coated with 1 µm thick thermal oxide film. Patterning was achieved using photolithography in which a primer and then photoresist were spin-coated onto the gold surface. After soft-backing the coated wafer at 100° C. for 1 min, a specially designed mask was placed over the surface and the wafer was exposed to UV light (total dosage ~190 mJ/cm$^2$). After 30 seconds of development, the wafer was then hard-baked at 120° C. for 10 min. The exposed areas were then etched away by gold and chromium etchants, and the photoresist was removed using acetone.

For deposition, the patterned wafers were immersed in solutions (pH=5.6, 0.8% (w/w) polymer) containing either fluorescently labeled chitosan or unlabeled chitosan, and the patterned gold surfaces were polarized to serve as negative electrodes. The positive electrode in these experiments was an unpatterned gold-coated silicon wafer. The two electrodes were connected to a dc power supply (model 6614C, Agilent Technologies) using alligator clips. Deposition was performed for 2 min by applying a voltage to achieve current densities of 1-2 A/m$^2$. After deposition, the wafers were removed from the solutions, rinsed for 1 min with deionized water, disconnected from the power supply, and dried at room temperature. After drying, the wafers were immersed in 1 M NaOH for 30 min to neutralize the chitosan. After neutralization, the wafers were rinsed with distilled water and dried at room temperature overnight.

Some experiments were performed in which NHS-fluorescein was reacted with chitosan after the chitosan had been deposited onto the patterned gold surfaces of the wafers. Other experiments were performed in which NHS-fluorescein was reacted with chitosan before the chitosan was deposited onto the patterned gold surface of the wafers. For this study, chitosan was first deposited as described above and the dried wafer was placed in a 140 cm diameter Petri dish with 35 mL of PES buffer (pH=7.4). The reaction was initiated by adding 20 µL of the DMF/ethanol solution containing NHS-fluorescein. After the reaction was allowed to proceed for 5 min, the wafer was rinsed with distilled water and dried at room temperature overnight.

The patterned wafers were examined using an optical microscope (model FS70, Mitutoyo Corp.), and photographs were taken with this microscope using a digital camera (Nikon DXM 1200). The patterned surfaces were also examined using a fluorescence stereomicroscope (MZFLIII, Leica) using a fluorescence filter set (GFP Plus) with an excitation filter at 480 nm (slit width of 40 nm) and an emission barrier filter at 510 nm. Photomicrographs were prepared from the fluorescence microscope using a digital camera (Spot 32, Diagnostic Instruments).

Example 1

The first example examined the selective deposition of fluorescently labeled chitosan onto a patterned surface. For this example, a silicon wafer was patterned to have two independent sets of gold surfaces. The photomicrographs in the top row of FIG. 5 were obtained using an optical microscope and show the patterns of the two sets of gold surfaces, with the right upper and left upper photomicrographs showing the gold surface patterns before and after deposition, respectively. The bottom row of photomicrographs of FIG. 5 was taken with a fluorescence microscope before and after deposition. The photomicrograph on left of the bottom row of FIG. 5 shows that prior to deposition, no image could be obtained from this patterned surface when a fluorescence microscope was used.

For deposition, the wafer was immersed in a solution containing the labeled chitosan and a negative voltage was applied to the polarizable gold surfaces. After 2 min of deposition, the wafer was removed from the solution, rinsed with deionized water, and then disconnected from the power supply. After neutralization and rinsing, the wafer was dried and then examined. The photographs from the optical microscope (top row of FIG. 5) show only slight differences between the polarizable and non-polarizable sets of gold surfaces. The photographs from the fluorescence microscope in the bottom row of FIG. 5 show dramatic differences with obvious images from the upper set of gold surfaces (which had been polarized to be negative), and no fluorescent images from the non polarized, lower set of gold surfaces. For convenience fluorescence micrographs are shown at two different magnifications (20× and 8×) in FIG. 5.

Figure 5:
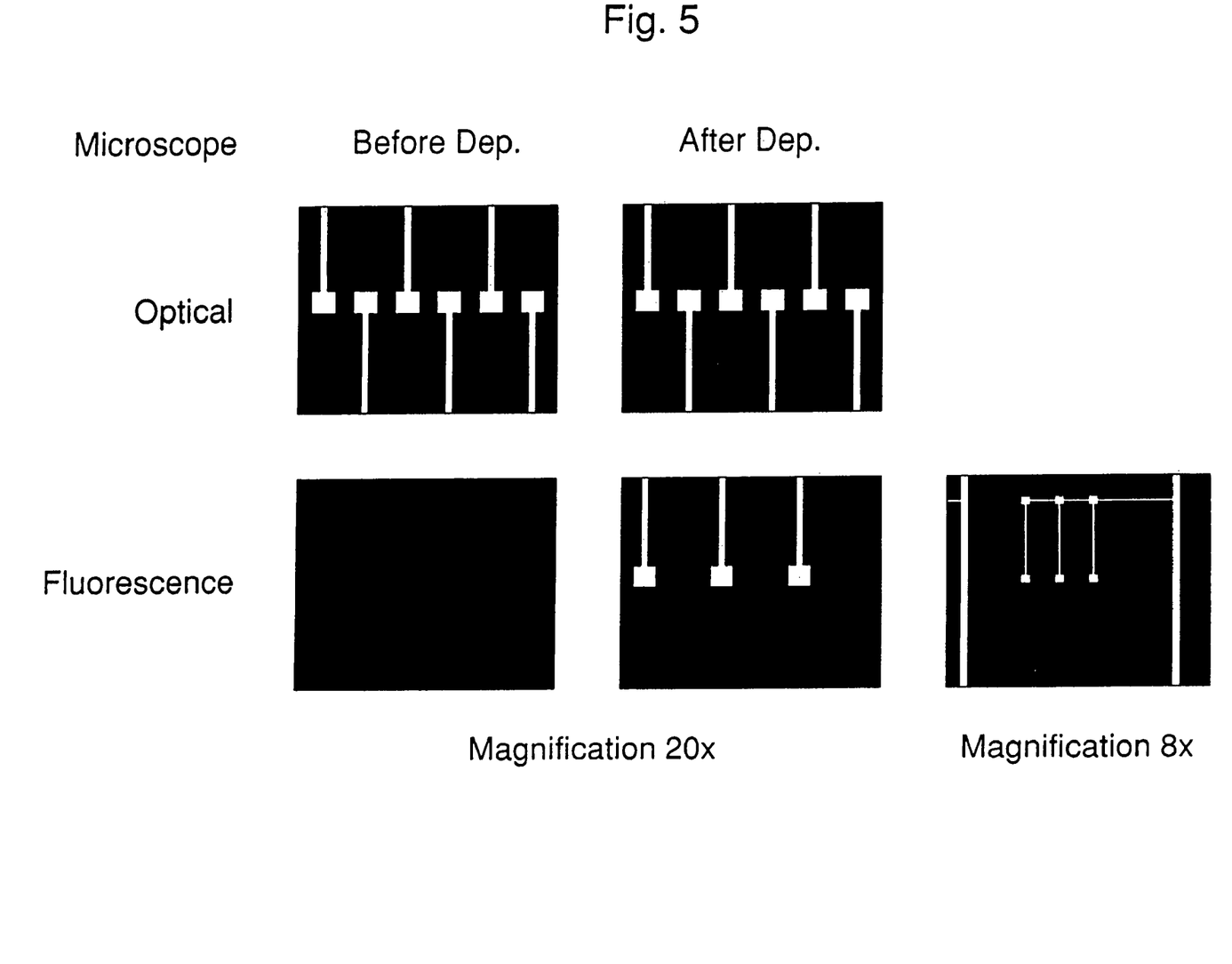
FIG. 5 shows photomicrographs taken of Example 1 described below.

In summary, FIG. 5 shows that the patterned gold surface serves as a platform for the spatially selective deposition of the fluorescently labeled chitosan. Further, no deposition was observed on the unpolarized gold surfaces. Thus, deposition occurs only in response to an applied voltage (or current), indicating that deposition can be controlled temporally and spatially based on when and where the voltage is applied.

Example 2

In the second example, unlabeled chitosan was deposited onto a patterned surface and examined the spatial selectivity for subsequent coupling reactions. For this example, a wafer was patterned to have a variety of gold lines with different widths and different spaces between the lines. The following table lists the dimensions of the various lines and spaces and shows that the lines vary in width from 20 to 1000 µm.

TABLE

| | Line thickness (µm) | | | | |
|---|---|---|---|---|---|
| | 20 | 50 | 100 | 500 | 1000 |
| Space (µm) | 500 | 500 | 500 | 1000 | 1000 |
| | 100 | 100 | 200 | 500 | 500 |
| | 20 | 50 | 100 | 200 | 300 |
| | 10 | 30 | 50 | 50 | 100 |
| | 5 | 10 | 10 | 10 | 50 |

For deposition, this patterned wafer was immersed in a chitosan solution and the gold surface was polarized to be negative for 2 min. After deposition, the wafer was neutralized, rinsed, and dried as described above. Photomicrographs of the region of the wafer patterned with 1 mm wide gold lines spaced 1 mm apart were taken. The optical microscope showed both the lines and spaces in this region. No fluorescence was observed (through the fluorescence microscope) before and after chitosan deposition for the gold-patterned surface (GPS) and for the unlabeled chitosan.

The next step in this example was to contact the wafer with a solution containing NHS-fluorescein. This fluorescein derivative was activated to react with amine groups and should react with any chitosan that had been deposited onto the gold pattern. After the patterned wafer was allowed to react with the NHS-fluorescein solution, the wafer was rinsed with distilled water and dried. The NHS-fluorescein treatment had little effect on the patterned surface when the wafer was examined with an optical microscope. In contrast, the fluorescence microscope showed a distinct fluorescent pattern. This photomicrograph indicated that chitosan had been deposited onto the patterned gold platform, and this "templated" chitosan layer underwent reaction with the amine-reactive fluorescein derivative.

As a control example, the patterned wafer was directly treated with NHS-fluorescein (without prior deposition of chitosan). After this treatment, the wafer was rinsed and dried. The photograph from the optical microscope revealed the distinct gold pattern while no pattern was observed using the fluorescence microscope. These observations demonstrated that there was no reaction between NHS-fluorescein and either the gold or silicon oxide surfaces of the wafer.

To further characterize the spatial selectivity of chitosan deposition and subsequent NHS-fluorescein coupling, several regions of the patterned surface were examined using the fluorescence microscope. Photomicrographs were taken for surfaces with 500 µm wide lines separated by spaces of different widths, i.e., a respective photomicrograph for each of 1000 µm, 500 µm, 200 µm, and 50 µm spacing. For surfaces with 100 µm, 50 µm, and 20 µm wide lines, respective photomicrographs were taken for each of 500 µm and 100 µm width spacing. These photographs showed (upon magnification to 20× or 40×) that the lines were well resolved even when they were separated by only 50 µm or 20 µm.

Example 3

Chitosan from crab shells (15% deacetylation and a molecular weight of 200,000 as reported by the supplier) and glass slides coated with indium tin oxide (ITO) were purchased from Sigma-Aldrich Chemicals. Fluorescently labeled latex nanoparticles (FluoSpheres, 100 nm, excitation maximum 540 nm and emission maximum 560 nm) and 5- (and 6-) carboxyfluorescein succinimidyl ester (NHS-fluorescein, excitation maximum 495 nm and emission maximum 519 nm) were purchased from Molecular Probes.

A chitosan solution was prepared by adding chitosan flakes to water and incrementally adding small amounts of HCl to the solution to maintain the pH near 3. After filtering undissolved material, the pH of the chitosan solution was adjusted to 5.0 using NaOH(1 M). Fluorescently labeled chitosan was prepared by reacting chitosan with NHS-fluorescein. Gold patterned silicon wafers were prepared using standard photolithographic methods. See, e.g., Wu, et al., Langmuir 2002, 18, 8620-8625; Wu et al., Langmuir 2003, 1.9, 519-524.

The cathode for electrodeposition was either an ITO-coated glass slide or a gold patterned silicon wafer, and the anode was either an ITO-coated glass slide or an unpatterned gold-coated silicon wafer. For electrodeposition, these electrodes were immersed in a suspension of fluorescently labeled latex nanoparticles in chitosan (pH 5.0, 1%, w/w, polymer). In some experiments, fluorescein-labeled chitosan was used in place of chitosan. Deposition was performed by connecting both the cathode and the anode to a direct current power supply (model 6614C, Agilent Technologies) and applying a voltage to achieve a constant current density of 0.05 mA/cm$^2$. The deposition time and the concentration of nanoparticles were varied in individual experiments. After deposition, the electrodes were disconnected from the power supply, removed from the suspension, rinsed with distilled water, and dried at room temperature.

The gold patterned wafers were examined by a fluorescence stereomicroscope (MZFLIII, Leica) using two fluorescence filter sets (FluoIII). The first filter set was used to detect the fluorescently labeled nanoparticles using an excitation wavelength of 560 nm (bandwidth of 40 nm) and a long-pass filter at 610 nm. The second filter set was used to detect fluorescein labeled chitosan using an excitation wavelength of 480 nm (bandwidth of 40 nm) and a long-pass filter at 510 nm. Photomicrographs were prepared from the fluorescence microscope using a digital camera (Spot 32, Diagnostic Instruments). In some cases, the spatial resolution of electrodeposition was examined by analyzing the fluorescence intensity profile using standard imaging software (Scion Corp.).

Deposits on the ITO-coated glass slides and the gold patterned silicon wafers were examined using a laser scanning confocal microscope (LeicaTCSSP2) equipped with a 100× oil immersion objective lens. To image the fluorescently labeled nanoparticles, an excitation wavelength of 488 nm was used and the emitted light in the range of 560-580 nm was collected. The images were optically sectioned in the direction normal to the substrate surface (i.e., the z direction) using z-step sizes of 122.1 nm.

It was observed that rehydration of the deposited films resulted in considerable swelling. To study film rehydration, nanoparticle-containing chitosan films were first electrodeposited onto gold patterned surfaces, and then the films were air-dried at room temperature overnight. To rehydrate the dried films, deionized water was added to the sample, and after 1 min, a coverslip was placed on top of the sample. Silicon oil was then applied to the boundary between the coverslip and the wafer to limit evaporation during imaging. Subsequent film drying was performed using a vacuum oven (45° C.) for approximately 90 min.

To demonstrate particle electrodeposition, fluorescently labeled nanoparticles (100 nm diameter) were suspended into a chitosan solution, and this suspension was electrodeposited onto an electrode surface. Both the cathode and the anode in these experiments were ITO-coated glass slides that were immersed in the suspension and polarized at a constant current density (0.05 mA/cm$^2$). After deposition, the electrodes were disconnected from the power supply, removed from the solution, rinsed with distilled water, and examined using a confocal microscope. When the cathode was examined, a significant number of labeled nanoparticles were observed in the field of view as shown by the fluorescence photomicrograph. More nanoparticles were deposited at the cathode when the deposition time was increased (10 min vs 3 min) and the nanoparticle concentration was increased (0.03% vs 0.003%). The nanoparticles in the deposited film were well-dispersed laterally. When the anode was examined, no fluorescence could be observed, indicating that deposition was limited to the cathode. Thus, the photomicrographs provided initial evidence of chitosan-mediated particle electrodeposition.

To assess the spatial selectivity of nanoparticle electrodeposition, a silicon wafer was fabricated to have micropattterned gold lines, and the patterned wafer was used as a cathode. Both the patterned cathode and the unpatterned anode (i.e., an unpatterned gold-coated wafer) were immersed in the chitosan solution that contained fluorescently labeled nanoparticles. After polarizing the electrodes (0.05 mA/cm$^2$) for 3 min, the wafers were disconnected from the power supply and removed from the suspension, and the cathode was rinsed with distilled water and examined.

The fluorescence photomicrograph showed that the nanoparticles only deposited onto the conducting gold surfaces that served as the cathode. The spatial resolution of nanoparticle electrodeposition on the cathodes was assessed by image analysis of the fluorescence. The fluorescence intensity profile showed that the chitosan-mediated deposition of the fluorescently labeled nanoparticles was achieved with high spatial resolution. As a control, chitosan was electrodeposited in the absence of fluorescently labeled nanoparticles and no fluorescence was observed, indicating that neither chitosan nor the patterned gold contributed fluorescence.

A series of controls were performed to demonstrate that chitosan was necessary for deposition and that chitosan conferred spatial selectivity to deposition. In the first control, deposition was attempted from a suspension of fluorescently labeled nanoparticles in the absence of chitosan. Reflection and fluorescence photomicrographs indicated that no deposition occurred for this "chitosan-less" control; thus, chitosan was necessary for deposition.

In a second set of controls, deposition experiments were performed with a fluorescein-labeled chitosan that appeared green using a filter set. Deposition of this fluorescein-labeled chitosan onto the patterned cathode occurred with high spatial selectivity when either (i) the labeled chitosan was deposited by itself or (ii) the labeled chitosan was deposited in the presence of the fluorescently labeled nanoparticles. Thus, chitosan conferred spatial selectivity to deposition.

While wide field images showed the nanoparticles to be well-distributed laterally, confocal imaging was required to determine if the particles were distributed throughout the chitosan film in the z direction (or if the particles were preferentially adsorbed at an interface—the inner gold—chitosan interface or the outer surface of the chitosan film). For this study, a suspension of fluorescently labeled nanoparticles in chitosan (0.03% nanoparticles in 1% chitosan solution) was electrodeposited onto a 20 micron patterned gold line. When the deposit was air-dried at room temperature, the film became very thin (on the order of 1 micron as measured by profilometry). A fluorescence projection image of a dried film was estimated to be 2.5 microns thick. Because the dried films were so thin, accurate optical cross-sectioning in the z direction could not be performed. Thus, it was not possible to determine if the nanoparticles were located throughout these dried films.

It was found that hydration leads to swelling of the chitosan film. Swelling of the hydrated chitosan film makes it possible to perform optical cross sectioning. A fluorescence intensity profile in the z direction indicated that the fluorescent nanoparticles were distributed throughout the film. An attempt to quantify the nanoparticle distribution throughout the film (i.e., to determine if the nanoparticles are distributed homogeneously) was not made because of difficulties in accounting for the strong reflection from the gold surface and potential quenching effects. The intensity profile indicated that the fluorescence extended 11.5 microns from the gold surface. It was believed that the edge of the fluorescence corresponded to the edge of the chitosan film, although this could not be independently confirmed. A fluorescence intensity profile for the labeled nanoparticles in the hydrated film showed that the nanoparticles were distributed throughout the chitosan film and that the nanoparticles were not confined to an interface.

The hydrated nanoparticle-containing film was examined using the confocal microscope. A magnified projection image of a central region of the film indicated that individual nanoparticles and aggregates were distributed throughout the hydrated chitosan film. Thus, the particles were distributed throughout the electrodeposited film.

Reversibility of Film Hydration: The observation that electrodeposited chitosan films swell substantially upon rehydration may have important implications as stimuli-responsive and addressable sensors. Initial studies were performed to ensure that film hydration does not disrupt the nanoparticle distribution within the chitosan film or lead to ejection of the nanoparticles. In these experiments, a series of drying and rehydration steps were performed, and the films were examined using the confocal microscope.

Figure 6:
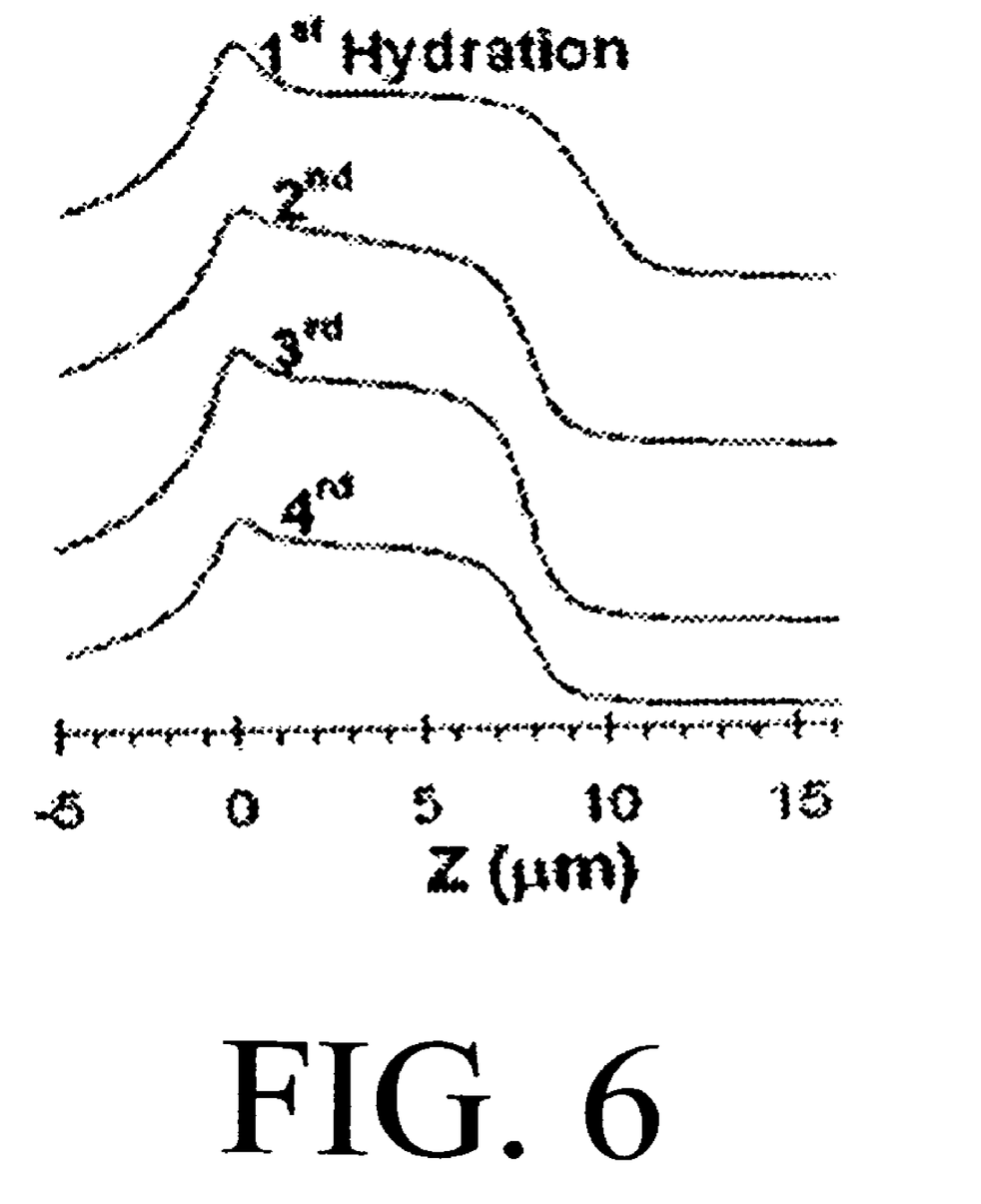
FIG. 6 shows nanoparticle fluorescence intensity profiles for a film sequentially hydrated four times.

FIG. 6 shows the nanoparticle fluorescence profiles for a film that had been sequentially rehydrated four times. Although the film's profile after the initial hydration step appeared somewhat different from the profiles observed after subsequent hydration steps, it is believed this difference was due to difficulties in performing this experiment. To limit water evaporation during imaging, oil was added to the interface between the wafer and the coverslip. It was believed that contact between the film and the oil reduced to some extent the film's ability to swell in subsequent hydration steps. The similarity of the shapes of the profiles in FIG. 6 provided evidence that the fluorescent beads remained distributed throughout the film. An attempt was not made to quantify particle retention by integrating the fluorescence intensity profiles because it was not possible to repeatedly image the same region of the film during this 10 day experiment. Nevertheless, it is believed the majority of the particles remained entrapped within the polymeric network during repeated rehydrations because fluorescence in wetted regions away from the films was not visually observed.

Rehydration results in about a fourfold increase in film thickness and the observed changes in the film thickness were repeatable, i.e., the thicknesses of the nanoparticle-containing rehydrated films underwent minor change as the result of each of the four sequential drying and rehydration steps. The fact that this film did not delaminate during the 10 days of this sequential drying and rehydration experiment provides further evidence for the stable adhesion between the chitosan film and the substrate surface.

The above experiment demonstrated that nanoparticles can be electrodeposited onto cathode surfaces using the pH-responsive aminopolysaccharide chitosan. When micropatterned gold cathodes were used, it was observed that nanoparticle deposition can be spatially controlled with a lateral resolution of 20 micron. Additionally, the results indicate that the nanoparticles were distributed throughout the chitosan film (and not localized at an interface). Finally, the chitosan films were observed to reversibly swell upon rehydration. It is expected that chitosan-mediated nanoparticle deposition can be broadly applicable.

The foregoing detailed description of the preferred embodiments of the invention has been provided for the purpose of explaining the principles of the invention and its practical application, thereby enabling others skilled in the art to understand the invention for various embodiments and with various modifications as are suited to the particular use contemplated. This description is not intended to be exhaustive or to limit the invention to the precise embodiments disclosed. Modifications and equivalents will be apparent to practitioners skilled in this art and are encompassed within the appended claims.

What is claimed is:

1. A method for selectively depositing a polymer in spatially selected regions, comprising:
   providing a substrate comprising a substrate surface, the substrate surface comprising a patterned electrically conductive portion and an electrically non-conductive portion;
   contacting the substrate surface with an aqueous solution comprising a selectively insolubilizable polysaccharide dissolved in the aqueous solution;
   subjecting the aqueous solution to electrochemical treatment to deposit, with spatial selectivity, the selectively insolubilizable polysaccharide on the patterned electrically conductive portion; and
   modifying the selectively insolubilizable polysaccharide to improve conjugatability with a reactive group of a component.

2. A method according to claim 1, wherein the selectively insolubilizable polysaccharide comprises an ionizable group that is ionized to provide a positive charge.

3. A method according to claim 2, wherein the ionizable group comprises a member selected from an, an alkyl amine group, a primary amine group, a secondary amine group, a tertiary amine group, a guanidinium group, an imidazole group, an indole group, a purine group, a pyrimidine group, and a pyrrole group.

4. A method according to claim 2, wherein the ionizable group comprises a primary amine group.

5. A method according to claim 4, wherein the selectively insolubilizable polysaccharide comprises chitosan.

6. A method according to claim 2, further comprising treating the deposited selectively insolubilizable polysaccharide with a sufficiently basic solution to stabilize the deposited selectively insolubilizable polysaccharide.

7. A method according to claim 1, wherein the selectively insolubilizable polysaccharide comprises an ionizable group that is ionized to provide a negative charge.

8. A method according to claim 7, wherein the ionizable group comprises a member selected from an alkoxide group, carboxyl group, hydroxy acid group, phenolic group, phosphate group, and sulfhydryl group.

9. A method according to claim 1, wherein the substrate comprises a non-conducting, inorganic material.

10. A method according to claim 9, wherein the substrate comprises silicon.

11. A method according to claim 10, wherein the patterned electrically conductive portion comprises gold.

12. A method according to claim 1, further comprising coupling a component to the selectively insolubilizable polysaccharide, the component selected from a biomolecule and cellular species.

13. A method according to claim 12, wherein said coupling is performed prior to the electrochemical treatment.

14. A method according to claim 12, wherein said coupling is performed subsequent to the electrochemical treatment.

15. A method according to claim 12, wherein said coupling comprises covalently bonding the component directly or indirectly to the selectively insolubilizable polysaccharide.

16. A method according to claim 12, wherein said coupling comprises covalently bonding the component to chitosan.

17. A method according to claim 12, wherein the component comprise one, two, three or more enzyme species.

18. A method according to claim 12, wherein the component comprise one, two, three or more antibody species.

19. A method according to claim 12, wherein the component comprise one, two, three or more receptor molecule species.

20. A method according to claim 12, wherein the component comprise one, two, three or more nucleic acid molecule species.

21. A method for selectively depositing a polymer in spatially localized regions of a micro-electrochemical device, comprising:
providing a micro-electromechanical device comprising a substrate surface, the substrate surface comprising a patterned electrically conductive portion and an electrically non-conductive portion;
contacting the substrate surface with an aqueous solution comprising a selectively insolubilizable polysaccharide dissolved in the aqueous solution;
subjecting the aqueous solution to electrochemical treatment to deposit, with spatial selectivity, the selectively insolubilizable polysaccharide on the patterned electrically conductive portion; and
modifying the selectively insolubilizable polysaccharide to improve conjugatability with a reactive group of a component.

22. A method according to claim 21, wherein the device comprises microchannels fabricated in a substrate such that electrodes are located within the microchannels to enable selective electrodeposition using fluidic flow in the microchannels.

23. A method for selectively depositing a polymer in spatially selected regions, comprising:
providing a substrate comprising a substrate surface, the substrate surface comprising a patterned electrically conductive portion and an electrically non-conductive portion;
contacting the substrate surface with an aqueous solution comprising a selectively insolubilizable polysaccharide dissolved in the aqueous solution;
subjecting the aqueous solution to electrochemical treatment to deposit, with spatial selectivity, the selectively insolubilizable polysaccharide on the patterned electrically conductive portion; and
treating the deposited selectively insolubilizable polysaccharide with a sufficiently acidic solution to stabilize the deposited selectively insolubilizable polysaccharide.

24. A method according to claim 23, wherein the selectively insolubilizable polysaccharide comprises chitosan.

25. A method according to claim 23, wherein the substrate comprises a non-conducting, inorganic material.

26. A method according to claim 23, further comprising coupling a component to the selectively insolubilizable polysaccharide, the component selected from a biomolecule and cellular species.

27. A method for selectively depositing a polymer in spatially selected regions, comprising:
providing a substrate comprising a substrate surface, the substrate surface comprising a patterned electrically conductive portion and an electrically non-conductive portion;
contacting the substrate surface with an aqueous solution comprising a selectively insolubilizable polysaccharide dissolved in the aqueous solution;
subjecting the aqueous solution to electrochemical treatment to deposit, with spatial selectivity, the selectively insolubilizable polysaccharide on the patterned electrically conductive portion; and
incorporating a nanoscale component in the polysaccharide deposited on the patterned electrically conductive portion.

28. A method according to claim 27, wherein the selectively insolubilizable polysaccharide comprises an ionizable group that is ionized to provide a positive charge.

29. A method according to claim 27, further comprising stabilizing the deposited selectively insolubilizable polysaccharide with one of a basic solution and an acid solution.

30. A method for selectively depositing a polymer in spatially selected regions of a micro-electromechanical device, comprising:
providing a micro-electromechanical device comprising an enclosed microfluidic channel and a surface having a patterned electrically conductive portion and an electrically non-conductive portion;
contacting the surface with an aqueous solution comprising a selectively insolubilizable polysaccharide dissolved in the aqueous solution; and
subjecting the aqueous solution to electrochemical treatment to deposit, with spatial selectivity, the selectively insolubilizable polysaccharide on the patterned electrically conductive portion.

31. The method according to claim 30, further comprising stabilizing the deposited selectively insolubilizable polysaccharide with one of an acidic solution and a basic solution.

32. The method of according to claim 30, further comprising modifying the selectively insolubilizable polysaccharide to improve conjugatability with a reactive group of a component.

33. The method according to claim 30, wherein the selectively insolubilizable polysaccharide comprises an ionizable group that is ionized to provide a positive charge.

34. A method according to claim 33, wherein the ionizable group comprises a primary amine group.

* * * * *